(12) United States Patent
Urata

(10) Patent No.: US 10,734,880 B2
(45) Date of Patent: Aug. 4, 2020

(54) LINEAR CONVEYOR DEVICE

(71) Applicant: YAMAHA HATSUDOKI KABUSHIKI KAISHA, Iwata-shi, Shizuoka-ken (JP)

(72) Inventor: Satoshi Urata, Shizuoka (JP)

(73) Assignee: YAMAHA HATSUDOKI KABUSHIKI KAISHA, Iwata-shi, Shizuoka-ken (JP)

( * ) Notice: Subject to any disclaimer, the term of this patent is extended or adjusted under 35 U.S.C. 154(b) by 0 days.

(21) Appl. No.: 16/322,062

(22) PCT Filed: Sep. 21, 2016

(86) PCT No.: PCT/JP2016/077900
§ 371 (c)(1),
(2) Date: Jan. 30, 2019

(87) PCT Pub. No.: WO2018/055709
PCT Pub. Date: Mar. 29, 2018

(65) Prior Publication Data
US 2019/0190366 A1    Jun. 20, 2019

(51) Int. Cl.
*H02K 41/03*   (2006.01)
*B23P 19/00*   (2006.01)
*H02K 41/02*   (2006.01)

(52) U.S. Cl.
CPC .......... *H02K 41/031* (2013.01); *B23P 19/002* (2013.01); *H02K 41/02* (2013.01)

(58) Field of Classification Search
CPC .................................................. B65G 54/02
See application file for complete search history.

(56) References Cited

U.S. PATENT DOCUMENTS 3,791,309 A  *  2/1974  Baermann ............... B61B 13/08
                                                           104/283
5,825,104 A  *  10/1998  Kondo ................... H02K 41/03
                                                           310/12.27

(Continued)

FOREIGN PATENT DOCUMENTS

CN          101136601 A        3/2008
JP          S63-044603 U       3/1988

(Continued)

OTHER PUBLICATIONS

International Search Report issued in PCT/JP2016/077900; dated Dec. 27, 2016.

(Continued)

*Primary Examiner* — William R Harp
(74) *Attorney, Agent, or Firm* — Studebaker & Brackett PC

(57) ABSTRACT

A linear conveyor device includes a slider having a linear motor mover; a straight-line conveyance part formed of a connected body of modules each having a linear motor stator and first and second guide rails for guiding movement of the slider on an upper surface of the module; and a cover member. The cover member covers the upper surface of the module so as to cover and conceal the linear motor stator and the first and second guide rails from above. The slider has a shape which allows the slider to be fitted on the cover member in a movable manner in an extending direction of the straight-line conveyance part.

16 Claims, 12 Drawing Sheets

(56) References Cited

U.S. PATENT DOCUMENTS

| | | | |
|---|---|---|---|
| 6,191,507 B1 | 2/2001 | Peltier et al. | |
| 6,734,583 B2 * | 5/2004 | Fujisawa | F16C 29/008 |
| | | | 310/12.27 |
| 8,134,258 B2 * | 3/2012 | Finkbeiner | F16C 29/004 |
| | | | 310/12.31 |
| 8,497,643 B2 * | 7/2013 | Takagi | H02K 11/215 |
| | | | 318/135 |
| 9,757,797 B2 * | 9/2017 | Urata | B22D 39/006 |
| 2011/0198947 A1 * | 8/2011 | Lin | H02K 41/02 |
| | | | 310/12.33 |

FOREIGN PATENT DOCUMENTS

| | | |
|---|---|---|
| JP | 2009-100509 A | 5/2009 |
| JP | 2013-099208 A | 5/2013 |
| JP | 5960411 B2 | 8/2016 |

OTHER PUBLICATIONS

An Office Action mailed by the Chinese Patent Office dated Apr. 3, 2020, which corresponds to Chinese Patent Application No. 201680088803.4 and is related to U.S. Appl. No. 16/322,062.

* cited by examiner

FIG.6
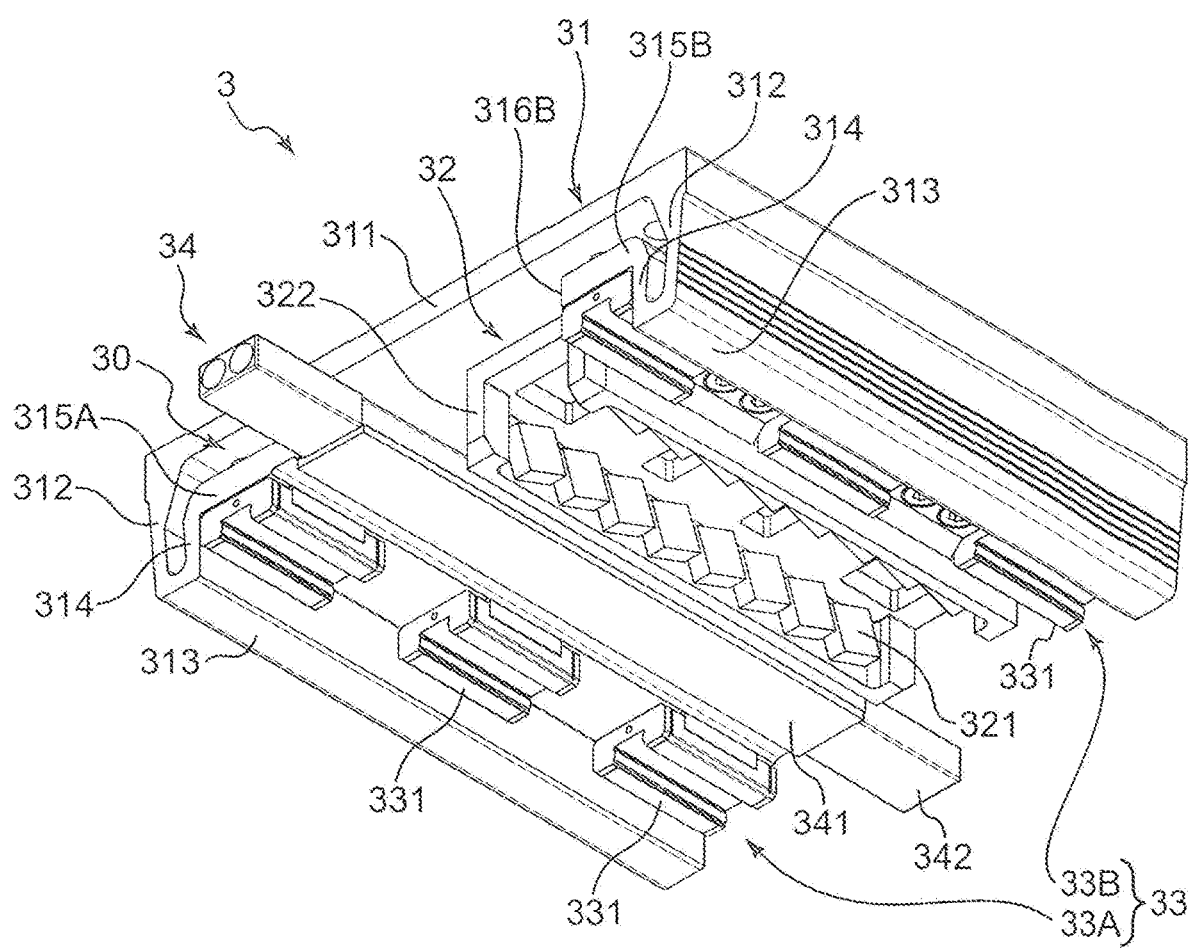
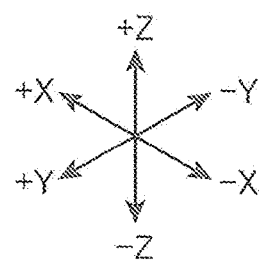

LINEAR CONVEYOR DEVICE

CROSS-REFERENCE TO RELATED APPLICATION

This application is a National Stage of International Patent Application No. PCT/JP2016/077900, filed Sep. 21, 2016, the entire content of which is incorporated herein by reference.

BACKGROUND

Technical Field

The present disclosure relates to a linear conveyor device having a linear motor mover and a linear motor stator.

Background Art

There has been known a linear conveyor which linearly moves a slider along a guide rail using a linear motor as a drive source. In the case of a movable magnet type linear motor, the guide rail is assembled to a base frame on which a linear motor stator is mounted, and a linear motor mover is mounted on the slider. The linear motor stator is an electromagnet disposed parallel to the guide rail, and the linear motor mover is a permanent magnet. A propulsion force is given to the slider with the supply of electricity to the electromagnet. The linear conveyor includes a linear scale formed of a magnetic scale mounted on the slider and a magnetic sensor mounted on the base frame. By controlling the supply of electricity to the electromagnet based on a position detection result by the linear scale, the slider is moved to a predetermined position as described, for example, in U.S. Pat. No. 6,191,507.

Conventionally, in this type of linear conveyor, conveyor constitutional members such as guide rails, a linear motor stator, and magnetic sensors and the like which are assembled to a base frame are exposed on an external surface of the base frame. This is because, to prevent the obstruction of movement of a slider on the base frame, it is difficult to arrange any members between the conveyor constitutional members and the slider. Accordingly, there has been a drawback that dust or contaminant adheres to the conveyor constitutional members, a foreign material impinges on the conveyor constitutional members, or an object to be conveyed by the slider falls and is sandwiched between the conveyor constitutional members.

SUMMARY

Therefore, the present disclosure provides a linear conveyor device which can overcome drawbacks such as contamination of constitutional members of a linear conveyor, impingement of a foreign material to the constitutional members, and falling of an object to be conveyed.

A linear conveyor device according to an aspect of the present disclosure includes a slider having a linear motor mover; a straight-line conveyance part including a linear motor stator and a guide portion for guiding movement of the slider on an upper surface of the straight-line conveyance part; and a cover member covering the upper surface of the straight-line conveyance part so as to cover and conceal the linear motor stator and the guide portion from above. The slider has a shape which allows the slider to be fitted on the cover member in a movable manner in an extending direction of the straight-line conveyance part.

Objects, technical features, and advantages of the present disclosure will become more apparent from the following detailed description and accompanying drawings.

BRIEF DESCRIPTION OF THE DRAWINGS

FIG. 6 is a perspective view of a lower surface side of a slider;

DETAILED DESCRIPTION

[Overall Configuration of Linear Conveyor Device]

Figure 1:
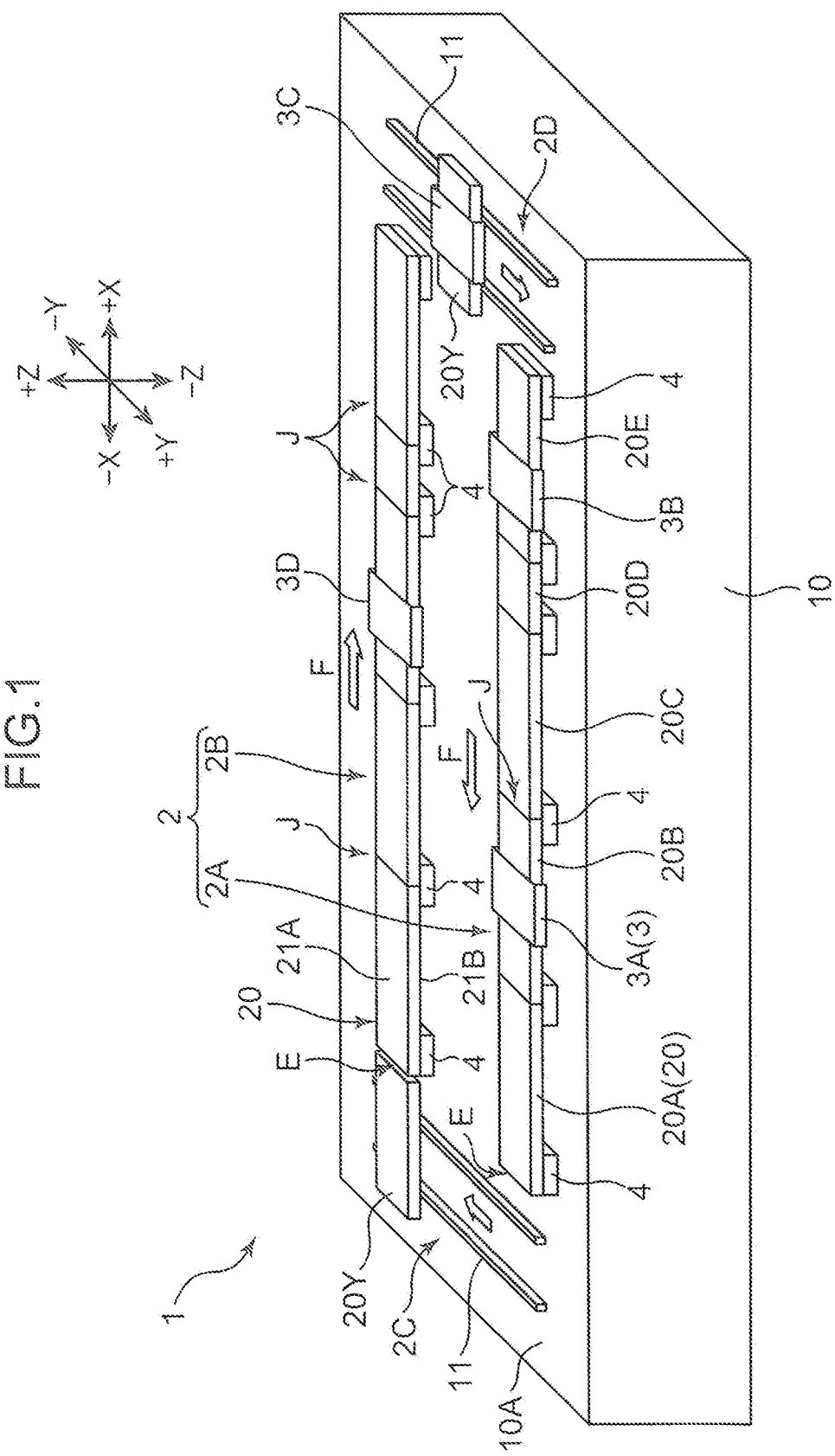
FIG. 1 is a perspective view schematically showing the overall configuration of a linear conveyor device according to an embodiment of the present disclosure.

Hereinafter, an embodiment of the present disclosure is described in detail with reference to drawings. FIG. 1 is a perspective view schematically showing the overall configuration of a linear conveyor device 1 according to an embodiment of the present disclosure. In FIG. 1, the indication of the XYZ directions is made. In FIG. 1, an X direction corresponds to a lateral direction (+X being a right side and −X being a left side), a Y direction corresponds to a longitudinal direction (+Y being a front side and −Y being a rear side), and a Z direction corresponds to a vertical direction (+Z being an upper side and −Z being a lower side). The same direction indication is also made in some other attached drawings.

The linear conveyor device 1 includes a pair of straight-line conveyance parts 2 (a first straight-line conveyance part 2A and a second straight-line conveyance part 2B) which is mounted on a platform 10 and extends in the X direction; a first direction changing part 2C and a second direction changing part 2D which are positioned on a −X side end portion and on a +X side end portion of the straight-line conveyance parts 2, respectively; a slider 3 which moves along the straight-line conveyance parts 2; and base members 4 which support the straight-line conveyance parts 2 on the platform 10. The straight-line conveyance parts 2 are formed of the first straight-line conveyance part 2A disposed on the platform 10 on a +Y side and the second straight-line conveyance part 2B disposed on the platform 10 on a −Y side parallel to the first straight-line conveyance part 2A. The first and second direction changing parts 2C, 2D connect the straight-line conveyance parts 2A, 2B to each other on a −X side end portion and a +X side end portion thereof.

The platform 10 includes an upper surface 10A which forms an installation surface for installing the linear conveyor device 1. It is basically desirable that the upper surface 10A be a surface having high flatness. However, in this embodiment, since the linear conveyor device 1 is installed using the base members 4, it does not cause a serious problem even when flatness of the upper surface 10A is not so high, or even when a small step exists, or even when the platform 10 is formed of split carts and joints exist on the upper surface 10A.

The first and second straight-line conveyance parts 2A, 2B are conveyance parts for moving the slider 3 in the X direction. The first and second direction changing parts 2C, 2D are conveyance parts for moving the slider 3 in the Y direction, and transfer the slider 3 between the first and second straight-line conveyance parts 2A, 2B. That is, the first and second direction changing parts 2C, 2D change a conveying direction of the slider 3. The first and second straight-line conveyance parts 2A, 2B are fixed-side units of the linear motor, and the slider 3 is a movable-side unit of the linear motor.

The first and second straight-line conveyance parts 2A, 2B are each formed by linearly connecting a plurality of modules 20 having a function of guiding the slider 3. The module 20 is a unit block on a fixed side which forms the linear motor together with the slider 3, and is a short straight-line block having a length of approximately 0.2 m to 1.0 m. The module 20 (a base frame 21 described later) has an upper surface 21A and a lower surface 21B which faces the platform 10. The module 20 is supported on the base member 4 in a state where the lower surface 21B is separated from the upper surface 10A of the platform 10. The upper surface 21A is an upper surface in a context that the upper surface 21A is disposed on a side opposite to the lower surface 21B which faces the platform 10. That is, in an actual installation mode of the module 20, it does not always mean that the upper surface 21A is directed upward.

FIG. 1 shows an example where the first straight-line conveyance part 2A is formed of modules 20A, 20B, 20C, 20D, and 20E which are sequentially connected to each other from a −X direction to a +X direction. In FIG. 1, an example is exemplified where the module 20D has a length shorter than those of the other modules. The second straight-line conveyance part 2B also has substantially the same structure. In this manner, a moving length of the slider 3 in the X direction can be set as desired by changing the number of modules 20 to be connected to each other or the combination of the modules 20 having different lengths.

The first and second direction changing parts 2C, 2D each include slide rails 11 and a changing module 20Y. The slide rails 11 are installed on the upper surface 10A of the platform 10 such that the slide rails 11 extend in the Y direction. The changing module 20Y is engaged with the slide rail 11 such that the changing module 20Y is movable in the Y direction along the slide rail 11. The changing module 20Y is movable between a terminal end portion E of the first straight-line conveyance part 2A and a terminal end portion E of the second straight-line conveyance part 2B, and is positioned and stopped with respect to the terminal end portions E by a drive mechanism not shown in the drawing.

The slider 3 is movable in a circulating manner on a circulatory path formed of the first and second straight-line conveyance parts 2A, 2B and the first and second direction changing parts 2C, 2D, the circulatory path being provided on the platform 10. FIG. 1 shows an example where four sliders 3A, 3B, 3C, and 3D are arranged on the circulatory path, and the sliders circulate in a slider moving direction F in a clockwise manner. The slider 3 moves from a +X side to a −X side of the first straight-line conveyance part 2A (also including a case where the slider 3 is moved in a reverse direction toward the +X side temporarily), and the slider 3 is transferred from the −X terminal end portion E to the changing module 20Y of the first direction changing part 2C. In a state where the slider 3 is mounted on the changing module 20Y, the changing module 20Y is moved in a −Y direction from the first straight-line conveyance part 2A to the second straight-line conveyance part 2B. Next, the slider 3 is transferred from the −X terminal end portion E to the second straight-line conveyance part 2B, and is moved toward the +X side. Then, the slider 3 is transferred to the changing module 20Y of the second direction changing part 2D, is moved in a +Y direction, and is transferred to the first straight-line conveyance part 2A again.

Although not shown in the drawing, along the circulatory path of the slider 3, various robots are disposed which perform the transfer of a workpiece such as a printed circuit board, an operation of mounting electronic parts and the like on the printed circuit board, for example. An upper surface of the slider 3 forms a placing surface on which the workpiece or the like is placed. The slider 3 is intermittently moved on the first and second straight-line conveyance parts 2A, 2B such that the slider 3 is stopped at an operation position of a robot which performs one step, and is moved toward an operation position of a robot which performs a next step after an operation in the above-mentioned one step is finished.

The base member 4 is disposed between the platform 10 and lower surfaces 21B of the modules 20 at a connecting portion J between the modules 20, and positions and supports a pair of modules 20 to be connected to each other. Further, the base members 4 are also disposed at the terminal end portions E of the first and second straight-line conveyance parts 2A, 2B. Conventionally, although the module 20 is directly attached to the platform 10, in this embodiment, the base member 4 is interposed between the modules 20 and the platform 10, and the modules 20 which are connected to each other are positioned relative to each other by making use of the base member 4.

Figure 2:
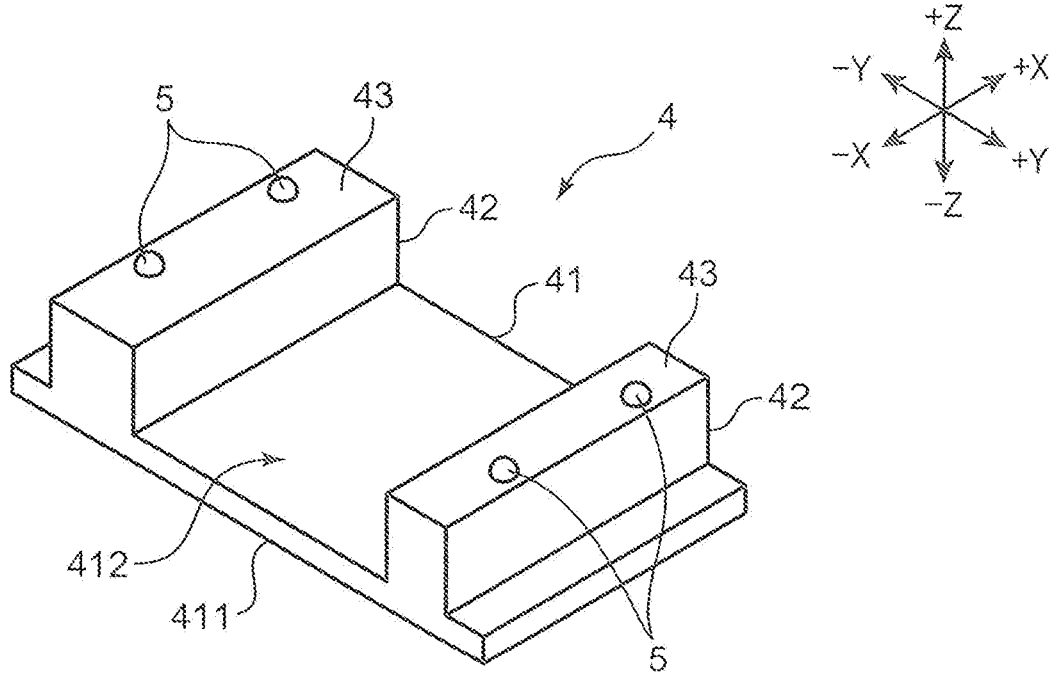
FIG. 2 is a perspective view of a base member where a linear conveyor is supported on a platform.

FIG. 2 is a schematic perspective view of a single body of the base member 4. The base member 4 is formed of a metal block made of metal having excellent rigidity such as aluminum. The base member 4 includes a flat plate like bottom plate 41, and a pair of protruding ridges 42 formed upright on the bottom plate 41 respectively in the vicinity of both ends of the bottom plate 41 in the Y direction and extending in the X direction. A bottom surface 411 of the bottom plate 41 is in contact with the upper surface 10A of the platform 10. An accommodating space 412 is formed between the pair of protruding ridges 42, and the accommodating space 412 is used as a space for accommodating a connector, a power source device and the like for the module 20.

Upper surfaces of the pair of protruding ridges 42 are support surfaces 43 which form mating surfaces with the lower surface 21B of the base frame 21. The support surfaces 43 support the X-direction end portions 211 (FIG. 3) of the pair of modules 20 (base frames 21) to be connected to each other from below. Four semispherical protrusions 5 are mounted on the support surfaces 43 in a protruding manner. The semispherical protrusions 5 are members for positioning the pair of modules 20. Receiving holes 25 (FIG.

3) into which the semispherical protrusions 5 are fitted are formed in the base frame 21. The semispherical protrusion 5 can be formed by an upper half semisphere of a ball, for example. In this case, holding holes each of which receives the ball in a state where the upper half semisphere of the ball protrudes from the support surface 43 are formed on the support surface 43. Here, protrusions having various shapes may be used as positioning members in place of the semispherical protrusions 5.

With respect to the pair of modules 20 to be connected to each other, both modules 20 are assembled to the base member 4 such that one out of the pair of modules 20 is fitted on two semispherical protrusions 5 on a +X side, and the other of the pair of modules 20 is fitted on two semispherical protrusions 5 on a −X side. Using such a base member 4, it is possible to provide the connecting portion J where the pair of modules 20 is connected to each other with high accuracy. That is, instead of directly connecting the modules 20 to each other, the modules 20 to be connected to each other are positioned with respect to the base member 4 and are mounted on the base member 4 respectively so that the pair of modules 20 can be connected to each other eventually. Accordingly, by merely increasing working accuracy of the base member 4, that is, by increasing positional accuracy of the semispherical protrusions 5, accuracy of connection between the modules 20 can be enhanced automatically. Further, the base member 4 is interposed between the modules 20 and hence, the modules 20 can be connected to each other without being affected by a state of the upper surface 10A of the platform 10. Accordingly, the modules 20 can be connected to each other simply with high accuracy.

[Detail of Module and Slider]

Figure 3:
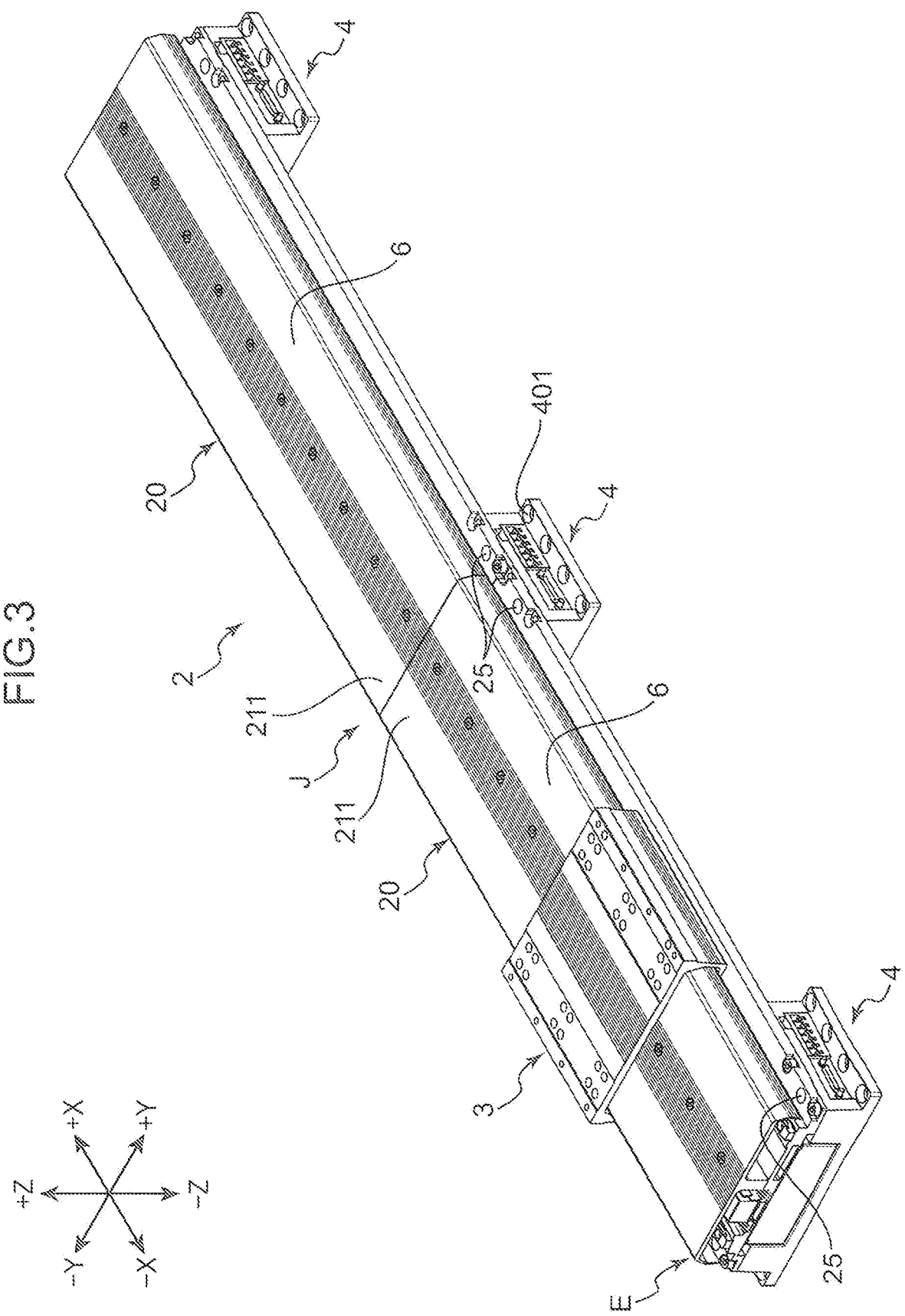
FIG. 3 is a perspective view of a connected body of two modules which form the linear conveyor device.
Figure 4:
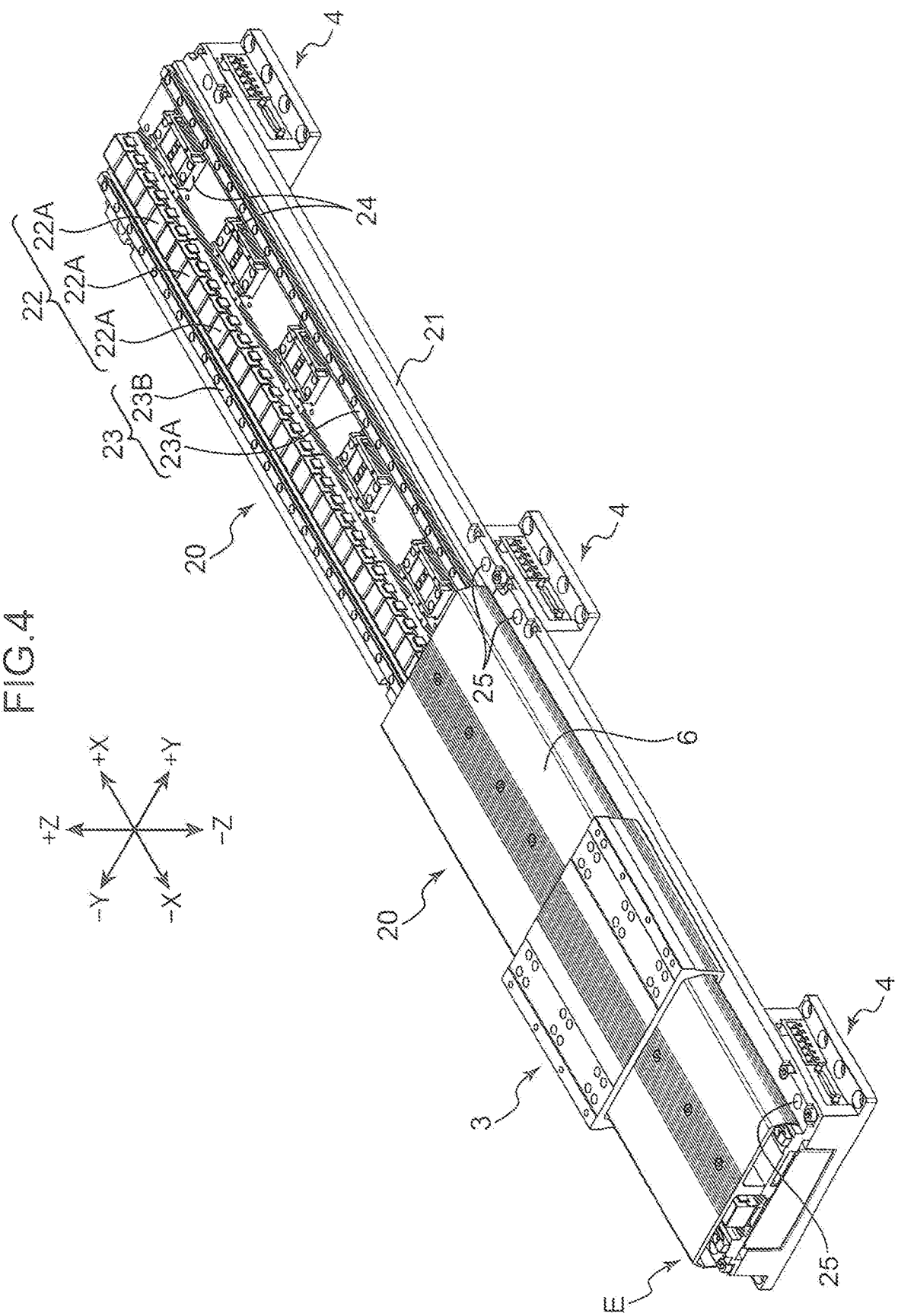
FIG. 4 is a perspective view of the linear conveyor device shown in FIG. 3 in a state where a cover member of one module is removed.
Figure 5:
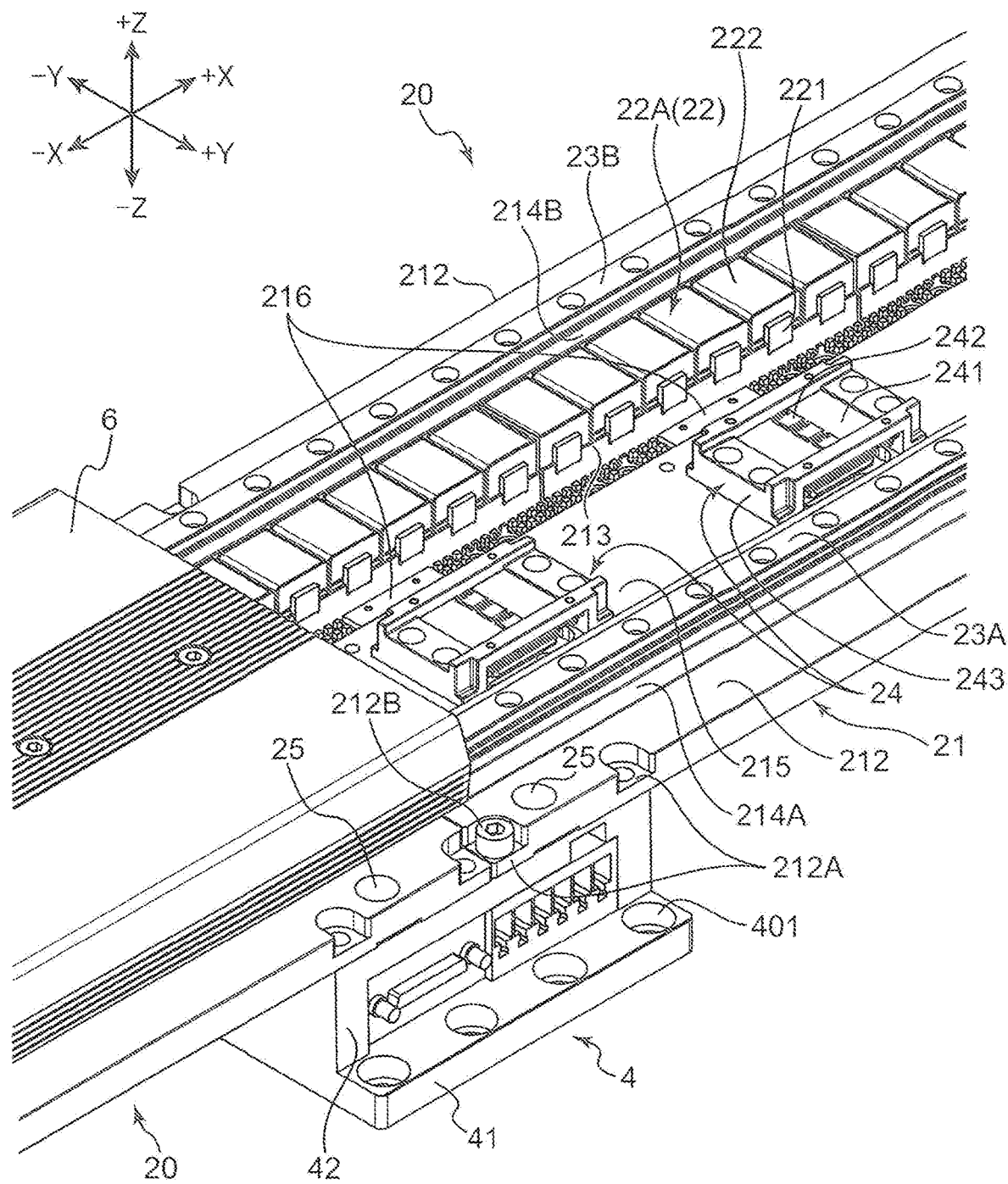
FIG. 5 is an enlarged perspective view of a module connecting portion shown in FIG. 4.

A specific example of the module 20 and a specific example of the slider 3 are described. FIG. 3 is a perspective view of a connected body of two modules 20 which form a portion of the straight-line conveyance part 2, FIG. 4 is a perspective view showing a state where the cover member 6 of one of two modules 20 shown in FIG. 3 is removed, FIG. 5 is an enlarged perspective view of a portion of the connecting portion J in FIG. 4, FIG. 6 is a perspective view of a lower surface side of the slider 3, and FIG. 7 is a cross-sectional view of the connecting portion J of the modules 20 which is taken along a plane extending in a Y direction.

Each module 20 includes the base frame 21, a linear motor stator 22, guide rails 23 (guide portions), and a magnetic sensor unit 24. In this embodiment, the cover member 6 is mounted on each of the modules 20. The slider 3 has a slider frame 31, a linear motor mover 32, a pair of guide blocks 33, and a magnetic scale 34.

The straight-line conveyance part 2 is formed of the connected body of the modules 20 which respectively include the cover member 6. The slider 3 is movably mounted on the straight-line conveyance part 2 in an extending direction of the straight-line conveyance part 2 in a mode where the slider 3 is fitted on the cover member 6. The modules 20 are supported on the platform 10 which forms a mounting base of the linear conveyor device 1 at the connecting portions J of the modules 20 and the terminal end portions E of the straight-line conveyance part 2 in a state where the modules 20 are positioned by the base members 4.

Figure 7:
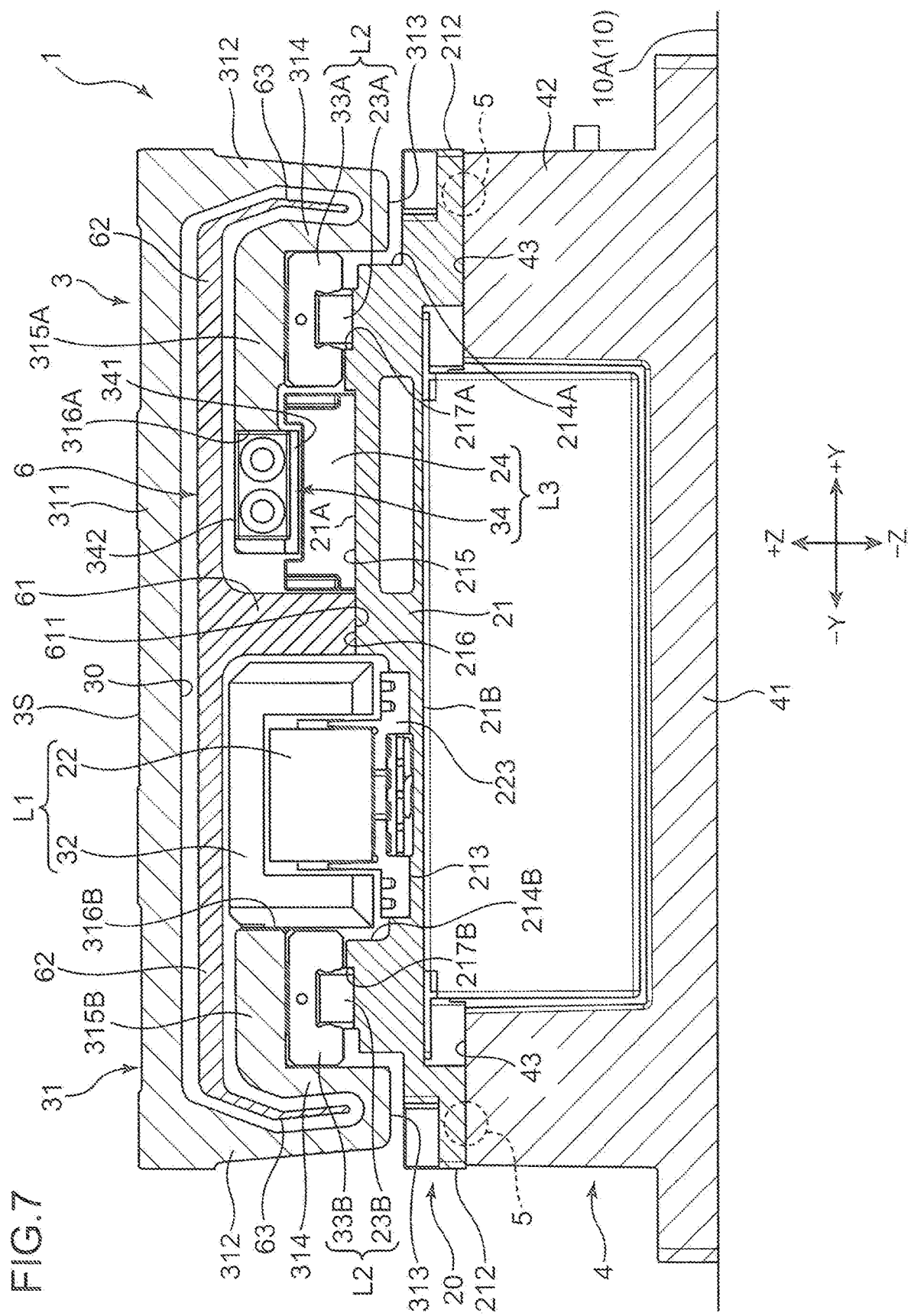
FIG. 7 is a cross-sectional view of a connecting portion between the modules taken along a plane extending in a Y direction.

As shown in FIG. 7, the linear conveyor device 1 includes a linear motor L1, linear guides L2, and a linear scale L3 which are formed of constitutional parts of the modules 20 and the slider 3. The linear motor L1 is formed of a linear motor stator 22 and a linear motor mover 32, the linear guides L2 are formed of a pair of guide rails 23 (first and second guide rails 23A, 23B) and a pair of guide blocks 33 (first and second guide blocks 33A, 33B), and the linear scale L3 is formed of a magnetic sensor unit 24 and a magnetic scale 34.

<Module>

The base frame 21 of the module 20 is a frame made of metal such as aluminum, and is a flat-plate-like member which forms the upper surface 21A and the lower surface 21B of the module 20. The upper surface 21A is a surface on which the linear motor stator 22, the guide rails 23, and the magnetic sensor unit 24 are mounted. The lower surface 21B is a surface which faces the upper surface 10A of the platform 10 with a predetermined distance therebetween, and is in contact with the support surfaces 43 of the base members 4. The base frame 21 (module 20) extends linearly in the X direction, and is connected to another base frame 21 at the X-direction end portion 211. At Y-direction end portions 212 of the base frame 21 which overlap with the base members 4, receiving holes 25 in each of which the semispherical protrusion 5 of the base member 4 is fitted are formed.

Mainly with reference to FIG. 5 and FIG. 7, the base frame 21 has a coil accommodating portion 213, a pair of rail pedestal portions 214A, 214B, a sensor pedestal portion 215, and a leg mounting portion 216 on an upper surface 21A side thereof. The coil accommodating portion 213 is a shallow recessed groove which extends in the X direction and is disposed at the position close to a −Y side of the base frame 21 with respect to the center in the Y direction. The linear motor stator 22 is assembled to the coil accommodating portion 213.

The pair of rail pedestal portions 214A, 214B is protruding ridges extending in the X direction which are disposed in pair at one side (+Y side) and the other side (−Y side) in the Y direction (a width direction orthogonal to the moving direction of the slider) of the base frame 21. The +Y-side rail pedestal portion 214A is disposed in a protruding manner in the vicinity of a +Y-side end portion 212 of the base frame 21, and the −Y-side rail pedestal portion 214B is disposed in a protruding manner in the vicinity of a −Y-side end portion 212 of the base frame 21. The first guide rail 23A is mounted on an upper surface of the +Y-side rail pedestal portion 214A, and the second guide rail 23B is mounted on an upper surface of the −Y-side rail pedestal portion 214B. The sensor pedestal portion 215 is a flat plate portion which is disposed at a position close to a +Y-side of the base frame 21 with respect to the center in the Y direction. The magnetic sensor unit 24 is mounted on the sensor pedestal portion 215. The leg mounting portion 216 is a portion disposed at a center region of the base frame 21 in the Y direction and forming a fixing portion for fixing the cover member 6.

A contact surfaces 217A, 217B are formed on inner portions of upper surfaces of the rail pedestal portions 214A, 214B respectively. Each of the contact surfaces 217A, 217B is a stepped portion where the inner portion is raised one stage higher than a guide rail installation surface of each of the rail pedestal portions 214A, 214B. The first and second guide rails 23A, 23B are positioned such that lower sides of the first guide rails 23A, 23B butt against the contact surfaces 217A, 217B respectively. By forming the contact surfaces 217A, 217B by step working in a series of workings performed succeeding to hole forming working of the receiving holes 25 and the holding holes for the balls formed on the base member 4, positions of the contact surfaces 217A, 217B can be set with high accuracy with respect to the semispherical protrusions 5. Accordingly, by merely assembling the pair of base frames 21 to the base members 4, the positioning of the guide rails 23A, 23B can be performed with high accuracy.

The linear motor stator 22 is an arranged body formed of a plurality of electromagnets 22A. That is, the linear motor stator 22 is formed by arranging, in a row in the X direction, a plurality of unit electromagnets 22A each of which is formed of a core 221 and a coil 222 wound around the core 221 (FIG. 5). The electromagnets 22A are held by the holder 223 (FIG. 7), and the holder 223 is fitted in the coil accommodating portion 213 of the base frame 21.

The first and second guide rails 23A, 23B are members which guide the movement of the slider 3. The first and second guide rails 23A, 23B are mounted on the upper surfaces of the rail pedestal portions 214A, 214B of the base frame 21 respectively, and form two raceways extending in the X direction on the upper surfaces 21A thereof. By connecting the X-direction end portions 211 of the plurality of base frames 21 to each other in a butting manner, a pair of unit guide rails 23A, 23B of the respective base frames 21 is connected to each other and hence, the guide rails 23A, 23B extending in a limitless manner can be formed.

The magnetic sensor unit 24 includes a sensor substrate 241, a magnetic sensor 242 which is mounted on the sensor substrate 241, and a housing 243 which holds the sensor substrate 241. A plurality of the magnetic sensor units 24 having such a configuration are arranged in a row in the X direction at a predetermined pitch. The magnetic sensor 242 is formed of a Hall element or an MR element, for example, and is provided for detecting the magnetic scale 34 on a slider 3 side described later and for generating a signal of an output voltage corresponding to magnetic flux density. In this embodiment, the magnetic sensor unit 24 is described with respect to an example where three magnetic sensors 242 are mounted on the sensor substrate 241 such that the magnetic sensors 242 are arranged in the Y direction. The housing 243 is fixed to the sensor pedestal portion 215 of the base frame 21 by screws.

<Cover Member>

The cover member 6 is mounted on the upper surface 21A such that the cover member 6 covers the upper surface 21A of the base frame 21 (straight-line conveyance part 2). The cover member 6 is formed of an extruded molded body made of metal such as aluminum, and includes a support leg 61, a horizontal cover portion 62, and a pair of side surface cover portions 63, and is a member having an approximately T shape or E shape as viewed in cross section in the Y direction.

The support leg 61 is a flat plate portion which extends in a vertical direction (Z direction) as viewed in cross section in the Y direction and extends in an elongated manner in the X direction, and is positioned in the vicinity of the center of the cover member 6 in the Y direction. A lower end surface 611 of the support leg 61 is fixed to a leg mounting portion 216 of the base frame 21. That is, the support leg 61 is formed upright on the upper surface 21A of the base frame 21 in a center region in the width direction. The horizontal cover portion 62 extends horizontally from an upper end of the support leg 61 toward the +Y side (one side in the width direction) and toward the -Y side (the other side in the width direction). The pair of side surface cover portions 63 respectively extends downward from end portions of the horizontal cover portion 62 on the +Y side and on the -Y side.

The horizontal cover portion 62 covers the upper surface 21A such that the horizontal cover portion 62 covers and conceals the linear motor stator 22, the pair of guide rails 23 and the magnetic sensor unit 24 mounted on the upper surface 21A of the base frame 21 from above. The side surface cover portions 63 cover outer sides of the first and second guide rails 23A, 23B. To describe the positional relationship of constitutional parts of the module 20, the linear motor stator 22 is disposed on the upper surface 21A between the support leg 61 and the second guide rail 23B (one of the guide portions). On the other hand, the magnetic sensor unit 24 is disposed on the upper surface 21A between the support leg 61 and the first guide rail 23A (the other of the guide portions). By mounting the cover member 6 in such a manner, it is possible to prevent the intrusion of contaminant and a foreign material into the upper surface 21A.

<Slider>

With reference to FIG. 6 and FIG. 7, the slider frame 31 of the slider 3 is a metal block formed of an extruded molded body made of metal such as aluminum, and includes an upper surface which forms a placing part 3S on which a workpiece is placed. The slider frame 31 has a fitting portion 30 which can be fitted on the base frame 21 having the cover member 6 from the X-direction end portion 211 of the fitting portion 30. The slider frame 31 includes an upper plate 311, a pair of side plates 312, a pair of bottom plates 313, a pair of inner side plates 314, a first lower plate 315A (facing portion), and a second lower plate 315B (facing portion).

The upper plate 311 is formed of a horizontal plate having the approximately same width as a width of the base frame 21 in the Y direction and has a predetermined length in the X direction. An upper surface of the upper plate 311 forms the placing part 3S. The side plates 312, the bottom plates 313, the inner side plates 314, and the first and second lower plates 315A, 315B have the same length as the upper plate 311 in the X direction. The pair of side plates 312 is a pair of vertical plates respectively extending downward from end portions of the upper plate 311 on the +Y side and the -Y side. The pair of bottom plates 313 (a portion of the lower plate) is a pair of horizontal plates extending from lower ends of the respective side plates 312 toward the center in the width direction (support leg 61) and having a short length in the Y direction. The bottom plates 313 are portions of the slider 3 which project downward most.

The pair of inner side plates 314 is a pair of vertical plates respectively extending upward from inner side ends of the respective bottom plates 313. A vertical width of the inner side plate 314 is approximately a half of a vertical width of the side plate 312. The first lower plate 315A extends from upper ends of the inner side plates 314 on the +Y side toward the center of the slider frame 31 in the width direction (-Y direction). The second lower plate 315B extends from the upper end of the inner side plate 314 on the -Y side toward the center of the slider frame 31 in the width direction (+Y direction). A first inner end surface 316A which is an inner side end surface of the first lower plate 315A and a second inner end surface 316B of the second lower plate 315B face each other at the same height.

The upper plate 311, the side plates 312, the bottom plates 313, the inner side plates 314, and the first and second lower plates 315A, 315B form a portion having a shape which is fitted in the cover member 6, that is, the fitting portion 30. The fitting portion 30 defines a cavity in which the cover member 6 is accommodated. In a state where the slider 3 is fitted on the module 20 and the cover member 6 is fitted on the fitting portion 30, the upper plate 311 is positioned on an upper side of the horizontal cover portion 62 of the cover member 6. That is, the placing part 3S is positioned above the cover member 6. The pair of side plates 312 is respectively positioned outside of end portions of the horizontal cover portion 62 on the +Y side and the −Y side. The bottom plates 313 are positioned below lower edges of the side surface cover portions 63, and the inner side plates 314 are positioned on an inner surface side of the side surface cover portions 63. Upper surfaces of the first and second lower plates 315A, 315B face a lower surface of the upper plate 311 and lower surfaces of the first and second lower plates 315A, 315B face the upper surface 21A (rail pedestal portions 214A, 214B) of the base frame 21.

The linear motor mover 32 includes: a plurality of permanent magnets 321 arranged in the X direction; and a back yoke 322 which holds the permanent magnets 321. The back yoke 322 is a member which holds the permanent magnets 321 and forms a magnetic path. The back yoke 322 has the gate-type structure which opens downward, and the electromagnets 22A (linear motor stator 22) are disposed between a pair of side plates which forms the gate-type structure. The plurality of permanent magnets 321 are arranged on the pair of respective side plates of the back yoke 322 (surfaces of the side plates which face the cores 221 of the electromagnets 22A) such that an N pole and an S pole appear alternately on the facing surfaces. The linear motor mover 32 is mounted on the slider frame 31 at a position where the linear motor mover 32 faces the linear motor stator 22 in the vertical direction. Specifically, a −Y side surface of the back yoke 322 is mounted on the second inner end surface 316B of the second lower plate 315B (one of the lower plates).

The first and second guide blocks 33A, 33B (guided portion) are engaged with the first and second guide rails 23A, 23B, and are moved in the X direction while being guided by the first and second guide rails 23A, 23B. The guide block 33 includes a bearing which rolls on the guide rail 23 in a contact manner. A pair of guide blocks 33A, 33B is mounted on the lower surface of the slider frame 31 at positions which respectively face the pair of guide rails 23A, 23B. Specifically, the first guide block 33A is mounted on a lower surface of the first lower plate 315A, and the second guide block 33B is mounted on a lower surface of the second lower plate 315B.

The magnetic scale 34 includes a scale substrate 341 and a holder 342 for the scale substrate 341. The scale substrate 341 includes permanent magnets (not shown in the drawing) which are arranged in the X direction such that an N pole and an S pole alternately appear on surfaces of the permanent magnets which face the magnetic sensor unit 24. In this embodiment, three arranged bodies of the permanent magnet are arranged in parallel in three rows in the Y direction so as to face three magnetic sensors 242 respectively. The magnetic scale 34 is mounted on the slider 3 such that the +Y side surface of the holder 342 is mounted on the first inner end surface 316A (the other surface of the lower plate) of the first lower plate 315A.

In a state where the first and second guide blocks 33A, 33B and the first and second guide rails 23A, 23B are respectively engaged with each other, an inner peripheral surface of the fitting portion 30 and an outer peripheral surface of the cover member 6 face each other with a gap having a predetermined width. That is, the slider 3 has a shape that the slider 3 surrounds an upper surface, both side surfaces and a portion of a lower surface of the cover member 6 from the outside. Accordingly, although the cover member 6 is mounted on the upper surface 21A of the base frame 21, the slider 3 can freely move in the X direction without interfering with the cover member 6. Further, the linear motor mover 32 and the magnetic scale 34 are mounted on the first and second lower plates 315A, 315B which form surfaces facing the upper surface 21A respec- tively. Accordingly, although the cover member 6 is interposed between the slider 3 and the base frame 21, the linear motor mover 32 can face the linear motor stator 22, and the magnetic scale 34 can also face the magnetic sensor unit 24.

The linear motor mover 32 forms the linear motor L1 together with the linear motor stator 22 on a base frame 21 side. In response to a signal from a motor controller not shown in the drawings, an electric current of any one of a U phase, a V phase, and a W phase which have different phases is supplied to the linear motor stator 22 (the coils 222 of the electromagnets 22A). With such an operation, a magnetic propulsion force is generated due to an interaction between a magnetic flux generated by the coils 222 and a magnetic flux generated by the permanent magnets 321 which the linear motor mover 32 has, and the slider 3 can be moved in the +X direction or in the −X direction by the propulsion force.

The first and second guide blocks 33A, 33B form the linear guide L2 together with the first and second guide rails 23A, 23B. The slider 3 which receives the propulsion force advances straightly in the X direction along the first and second guide rails 23A, 23B. The magnetic scale 34 forms the linear scale L3 together with the magnetic sensor unit 24. The linear scale L3 is provided for detecting the position of the slider 3 in the X direction. By controlling power supply to the coils 222 of the electromagnets 22A based on a result of the position detection of the slider 3 by the linear scale L3, the slider 3 is moved to the target position.

[Assembling Example of Module]

Figure 8:
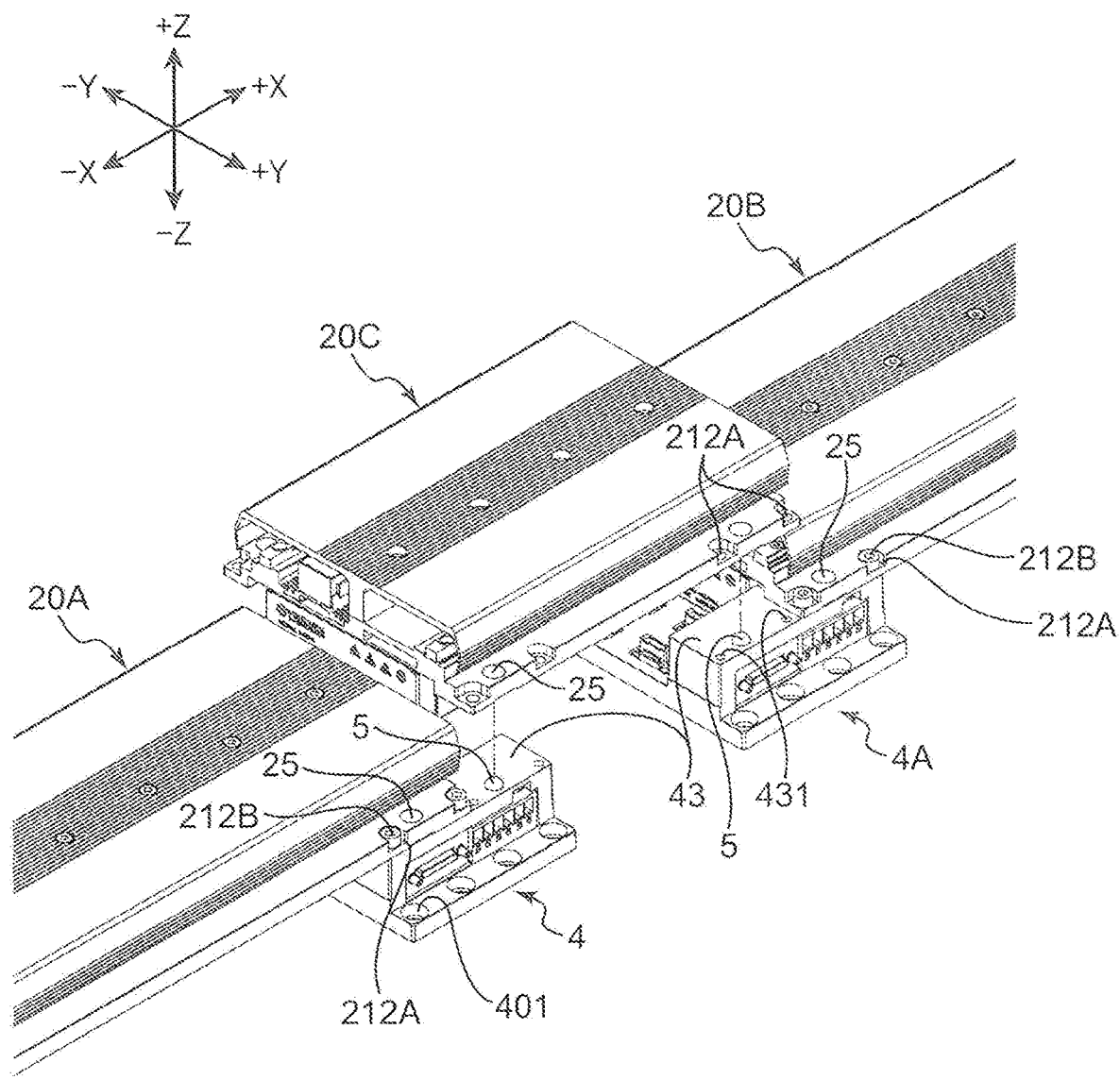
FIG. 8 is a perspective view of an assembled example of the modules.

FIG. 8 is a perspective view of an assembling example of the modules 20. FIG. 8 shows a part of the upper surface portion of the base member 4. Also with reference to FIG. 7, in the same manner as the base member 4 shown in FIG. 2, the base member 4 has the bottom plate 41, the protruding ridges 42, and the support surfaces 43. The semispherical protrusions 5 (formed by embedding lower half semispheres of balls on the support surfaces 43) are disposed on the support surface 43. The bottom surface of the bottom plate 41 is brought into face contact with the upper surface 10A of the platform 10, and the support surfaces 43 support the lower surface 21B of the base frames 21 at the connecting portion J between the modules 20. The module 20 is mounted on the base member 4 such that the semispherical protrusions 5 are fitted in the receiving holes 25 of the base frames 21 and hence, the pair of modules 20 to be connected to each other can be positioned.

The base member 4 includes threaded holes 431 which are formed in the support surfaces 43 in a vertical direction, and fixing portions 401 which are formed of through holes formed in the −Y side end portion and the +Y side end portion of the bottom plate 41 in the vertical direction. The threaded holes 431 are threaded holes for detachably fixing the respective modules 20 to the base member 4. Mounting holes 212A formed in the base frames 21 are made to overlap with the threaded holes 431 from above, and fixing screws 212B are threadedly engaged with the threaded holes 431 or the threaded engagement between the fixing screws 212B and the threaded holes 431 is released. Accordingly, the module 20 is mounted on or removed from the base member 4.

On the other hand, the fixing portions 401 are holes for fixing the base member 4 to the platform 10 in a detachable manner. The fixing portions 401 are positioned to be aligned with bolt holes not shown in the drawing formed in the upper surface 10A, and are fastened to the platform 10 by bolts not shown in the drawing. In this manner, mounting and removal of the module 20 to and from the base member 4 and mounting and removal of the base member 4 to and from the platform 10 can be performed as desired and hence, the addition, the interruption, the exchange or the like of the module 20 can be easily performed by a user.

In FIG. 8, a case is exemplified where a short third module 20C is interrupted between a first module 20A and a second module 20B. Assume that a connecting portion between the first and second modules 20A, 20B is supported on a first base member 4, in this case, a second base member 4A is newly added. In this case, the second module 20B is removed from the first base member 4, and the second module 20B is shifted by an amount equal to a length of the third module 20C in a +X direction. The second base member 40A is fixed to the platform 10 at the fixing portions 401 at a pitch equal to the length of the third module 20C with respect to the first base member 4.

The second module 20B is mounted on a +X side support surface 43 of the second base member 4A. On the other hand, the +X side support surface 43 of the first base member 4 and a −X side support surface 43 of the second base member 4A form support surfaces for supporting the third module 20C. The third module 20C is placed on the first and second base members 4, 4A such that semispherical protrusions 5 carried on the respective support surfaces 43 are fitted in receiving holes 25 formed on a −X side and on a +X side of the base frame 21 of the third module 20C. Then, the fixing screws 212B are threadedly engaged with the threaded holes 431 through the mounting holes 212A and hence, the interruption operation of the third module 20C is completed.

In this manner, by merely mounting the third module 20C on the first and second base members 4, 4A having the semispherical protrusions 5 respectively, all parts necessary for constructing a linear conveyor can be connected to each other with high accuracy. That is, due to the above-mentioned mounting, a group of parts consisting of the linear motor stator 22, the pair of guide rails 23A, 23B, and the magnetic sensor unit 24 which the third module 20C includes are connected with the corresponding groups of parts which the first and second modules 20A, 20B respectively include in a highly accurately positioned state. Further, positioning of the end surfaces of the cover members 6 of the modules to be connected to each other is also completed. Accordingly, the interruption of the third module 20C can be performed with a simple operation. An exchange of the third module 20C in the case where the first to third modules 20A to 20C are already connected to each other and the addition of a new module to a terminal end portion E of an existing straight-line conveyance part 2 and the like can be also performed with a simple operation substantially equal to the above-mentioned operation.

[Manner of Operation and Advantageous Effects]

According to the linear conveyor device 1 of this embodiment, the following advantageous effects can be acquired. The linear conveyor device 1 includes the cover member 6 which covers the upper surface 21A of the base frame 21 (straight-line conveyance part 2) so as to cover and conceal the linear motor stator 22, the guide rails 23A, 23B, and the magnetic sensor unit 24 from above. Accordingly, it is possible to prevent the intrusion of contaminant, a foreign material and the like into the constitutional members of the linear conveyor from above. Further, the slider 3 includes the fitting portion 30 to be fitted to the cover member 6 and hence, the movement of the slider 3 is not prevented.

The support leg 61 of the cover member 6 is mounted upright on the center region of the upper surface 21A of the base frame 21 in the width direction, and the horizontal cover portion 62 extends from the upper end of the support leg 61 toward the +Y and the −Y directions. In this manner, by forming the cover member 6 into a T shape in cross section in a width direction, it is possible to provide the structure where the entire upper surface 21A of the base frame 21 is covered and concealed by the horizontal cover portion 62 in a well-balanced manner in the width direction. Accordingly, even when an unexpected load is applied to the cover member 6, for example, even when an operator leans against the cover member 6 or the operator pushes the cover member 6 with his hand, the cover member 6 can be minimally deformed. Further, it is possible to acquire an advantageous effect that the slider 3 to be fitted on the cover member 6 is also formed into a well-balanced shape in a width direction.

In this embodiment, the cover member 6 further includes side surface cover portions 63 respectively extending downward from the +Y end portion and the −Y end portion of the horizontal cover portion 62. The sides of the base frame 21 (the sides of the first and second guide rails 23A, 23B) can also be covered and concealed by the side surface cover portions 63 and hence, protective performance of the cover member 6 against contaminant, foreign materials and the like can be further increased.

The linear motor stator 22 and the magnetic sensor unit 24 are disposed on the upper surface 21A of the base frame 21 such that the linear motor stator 22 is disposed between the support leg 61 and the second guide rail 23B, and the magnetic sensor unit 24 is disposed between the support leg 61 and the first guide rail 23A. In this embodiment, as shown in FIG. 7, the linear motor stator 22 and the magnetic sensor unit 24 are disposed in a mode where the linear motor stator 22 and the magnetic sensor unit 24 are disposed in the vicinity of the −Y side surface and the +Y side surface of the support leg 61 respectively. The horizontal cover portion 62 has a width in the Y direction capable of covering the first and second guide rails 23A, 23B from above. The linear motor stator 22 and the magnetic sensor unit 24 which are disposed inside the first and second guide rails 23A, 23B are covered by the horizontal cover portion 62 with certainty and hence, it is possible to completely protect the linear motor stator 22 and the magnetic sensor unit 24.

The slider frame 31 of the slider 3 includes the fitting portion 30 to be fitted on the cover member 6. The fitting portion 30 is formed of the upper plate 311, the side plates 312, the bottom plate 313, the inner side plates 314, and the first and second lower plates 315A, 315B. Accordingly, the slider frame 31 has a structure of wrapping the cover member 6. The linear motor mover 32, the first and second guide blocks 33A, 33B, and the magnetic scale 34 are mounted on the first and second lower plates 315A, 315B. Accordingly, even in the case where the cover member 6 is mounted on the upper surface 21A of the base frame 21, a function of the linear conveyor can be achieved by the modules 20 and the slider 3 and, at the same time, the configuration can be achieved where the slider is freely movable in the extending direction of the straight-line conveyance parts 2. Further, the slider 3 can be easily fitted on the cover member 6 from an end edge of the cover member 6 and hence, no problem occurs also in an operation performed at the first and second direction changing parts 2C, 2D.

The bottom plate 313 of the slider frame 31 is disposed at the position where the slider 3 protrudes downward most. The bottom plate 313 is a flat plate portion, protrudes downward than the lower end surface 611 of the support leg 61, and protrudes downward than any one of the lower surfaces of the linear motor mover 32, the first and second guide blocks 33A, 33B, and the magnetic scale 34 which are held by the first and second lower plates 315A, 315B. Accordingly, when the slider 3 is removed from the module 20 and the slider 3 is placed on the upper surface 10A of the platform 10 or the like, for example, the bottom plate 313 is brought into contact with the upper surface 10A, and other portions of the slider 3 are not brought into face contact with the upper surface 10A. Accordingly, it is possible to prevent the linear conveyor parts carried on the slider 3 from being damaged, contaminated or the like.

The straight-line conveyance part 2 is formed by linearly connecting the plurality of modules 20, and the cover member 6 is provided to each of the modules 20. Accordingly, by merely connecting a desired number of modules 20, a conveyance path length of the straight-line conveyance part 2 can be set as desired. Further, the cover member 6 is provided to each of the modules 20 and hence, it is possible to achieve the protection of the respective modules against contaminants, foreign materials and the like by merely connecting the modules 20.

[Description of Modifications]

Figure 9:
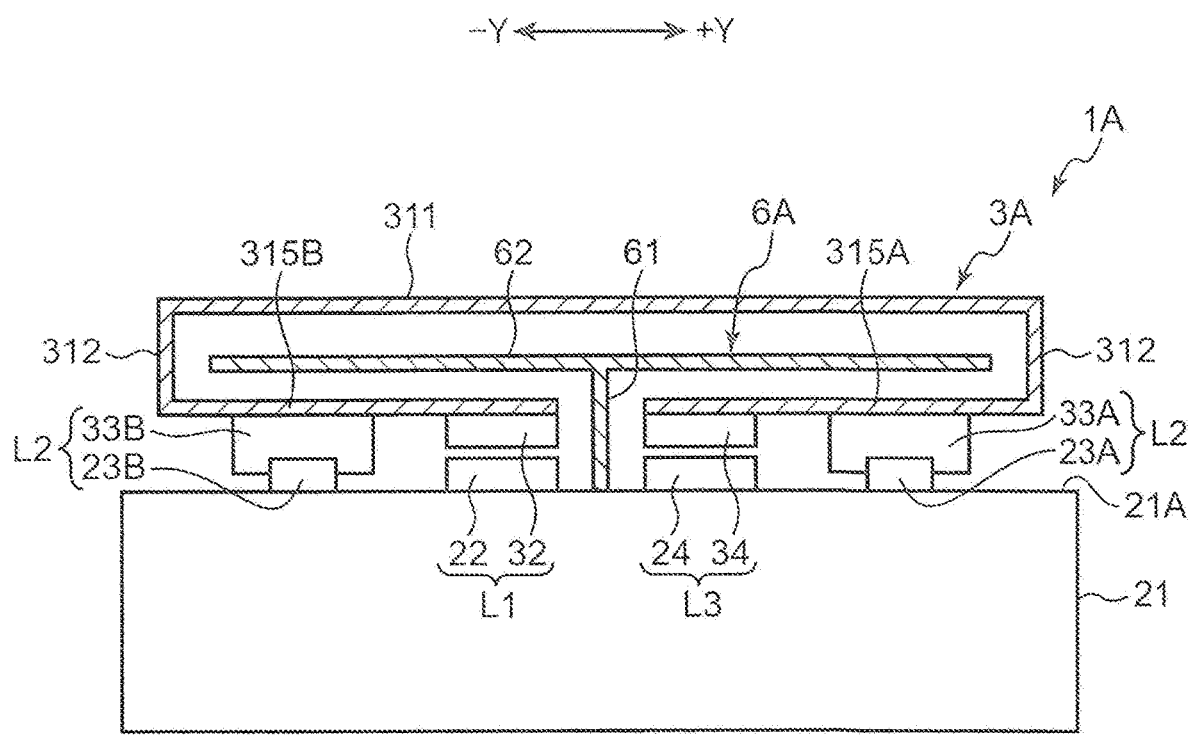
FIG. 9 is a schematic cross-sectional view of a linear conveyor device according to a first modification.

A modification of the slider 3 and the cover member 6 is exemplified. FIG. 9 is a schematic cross-sectional view of a linear conveyor device 1A according to a first modification in a width direction. A cover member 6A of the linear conveyor device 1A includes a support leg 61 and a horizontal cover portion 62. However, the cover member 6A does not include the side surface cover portions 63 of the above-mentioned embodiment. However, a linear motor stator 22, first and second guide rails 23A, 23B, and a magnetic sensor unit 24 are covered and concealed by the horizontal cover portion 62 from above.

A slider 3A includes an upper plate 311, side plates 312, and first and second lower plates 315A, 315B so as to surround the periphery of the T-shaped cover member 6A. The first and second lower plates 315A, 315B respectively extend inward in the width direction from lower end portions of the side plates 312. However, the bottom plates 313 and the inner side plates 314 shown in the above-mentioned embodiment are not provided. The linear motor mover 32, the first and second guide blocks 33A, 33B, and the magnetic scale 34 are mounted on suitable portions of the first and second lower plates 315A, 315B respectively so as to face the linear motor stator 22, the first and second guide rails 23A, 23B and the magnetic sensor unit 24.

According to the first modification, the horizontal cover portion 62 covers the upper surface 21A of the base frame 21 and hence, it is possible to prevent intrusion of contaminants, foreign materials and the like into the constitutional parts of the linear conveyor disposed on the upper surface 21A. Further, due to omission of the side surface cover portions 63, it is possible to provide the cover member 6A having a simple configuration, and hence a manufacturing cost can be reduced. For example, the cover member 6A can be manufactured by a method where a flat plate for forming the support leg 61 and a flat plate for forming the horizontal cover portion 62 are connected to each other by screws or by welding without using extrusion molding.

Figure 10:
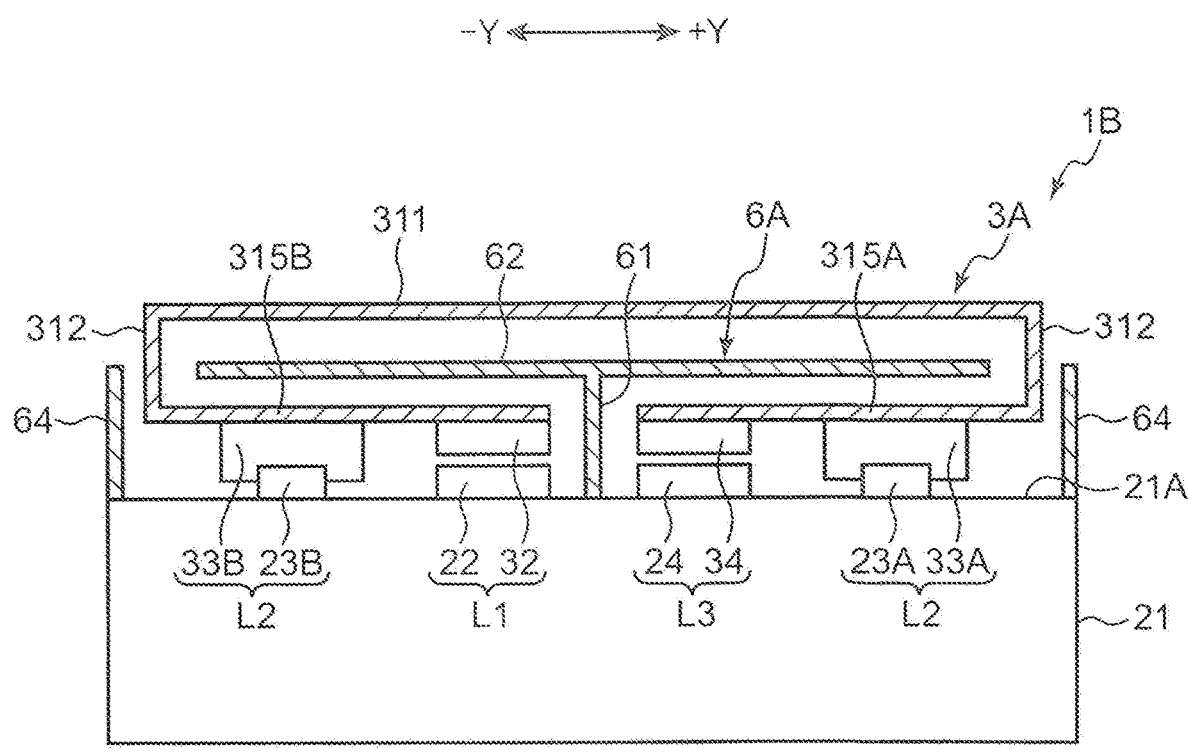
FIG. 10 is a schematic cross-sectional view of a linear conveyor device according to a second modification.

FIG. 10 is a schematic cross-sectional view of a linear conveyor device 1B according to a second modification in a width direction. Configurations of a slider 3A and a cover member 6A are equal to the configurations of the slider 3A and the cover member 6A of the first modification in FIG. 9. The technical feature which makes the second modification different from the first modification lies in that side plates 64 are formed upright from a +Y end portion and a −Y end portion of an upper surface 21A of a base frame 21 respectively. A height of the upper ends of the side plates 64 is substantially equal to a height position of the horizontal cover portion 62. A pair of side plates 312 of the slider 3A penetrates gaps formed between the respective side plates 64 and +Y and −Y end portions of the horizontal cover portion 62 respectively. According to the second modification, not only an upper side of the upper surface 21A of the base frame 21 is covered but also the sides of the upper surface 21A are covered by the side plates 64 and hence, it is possible to more favorably guard the upper surface 21A.

Figure 11:
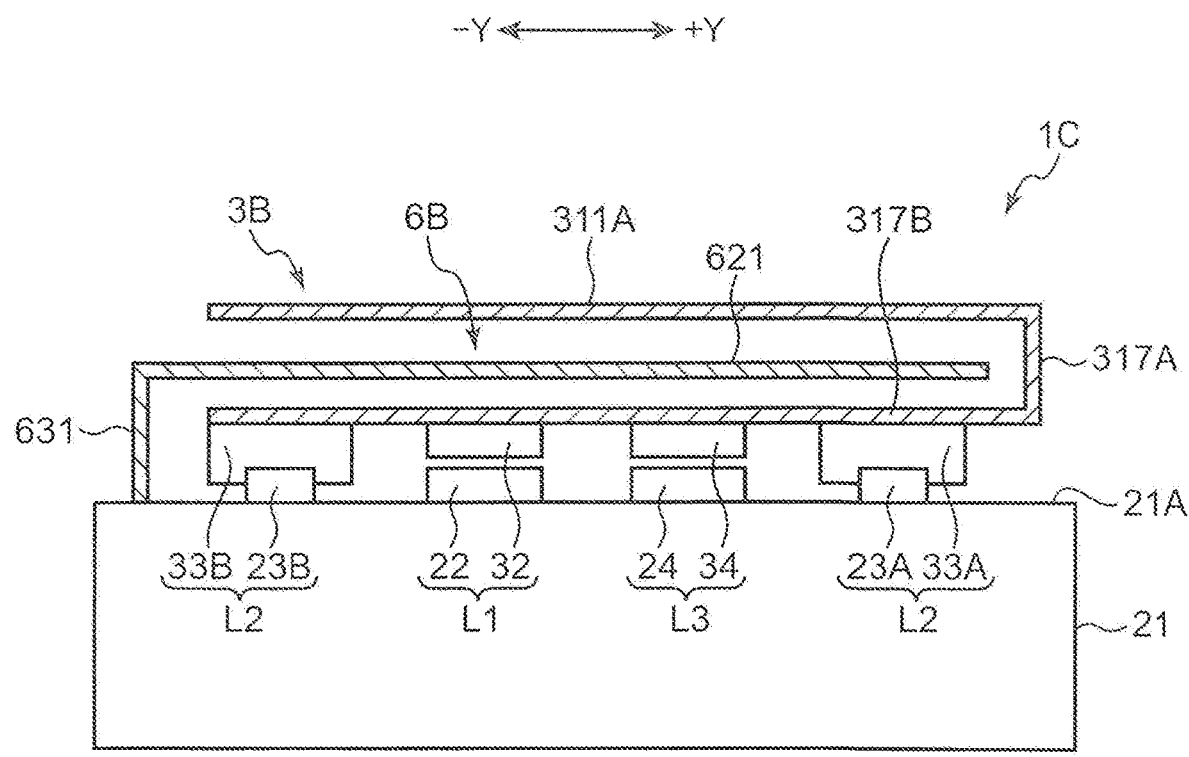
FIG. 11 is a schematic cross-sectional view of a linear conveyor device according to a third modification.

FIG. 11 is a schematic cross-sectional view of a linear conveyor device 1C according to a third modification in a width direction. A cover member 6B of the linear conveyor device 1C is an L-shaped member including a side end support leg 631 and a horizontal cover portion 621. The side end support leg 631 is formed upright on a −Y end portion (one end in a width direction) of the upper surface 21A of the base frame 21. The horizontal cover portion 621 extends in a horizontal direction from an upper end of the side end support leg 631 to the position in the vicinity of the +Y end portion of the base frame 21 thus covering and concealing a linear motor stator 22, first and second guide rails 23A, 23B, and a magnetic sensor unit 24 from above.

A slider 3B of the linear conveyor device 1C is a U-shaped member including an upper plate 311A, a vertical plate 317A, and a bottom plate 317B. The upper plate 311A and the bottom plate 317B respectively formed of a horizontal plate are arranged parallel to each other with a predetermined distance therebetween in a vertical direction, and the +Y end portion of the upper plate 311A and the +Y end portion of the bottom plate 317B are connected to each other by the vertical plate 317A. The slider 3B is assembled to the base frame 21 in a state where the horizontal cover portion 621 is accommodated in a cavity formed between the upper plate 311A and the bottom plate 317B. A linear motor mover 32, first and second guide blocks 33A, 33B, and a magnetic scale 34 are mounted on a lower surface of the upper plate 311A.

Figure 12:
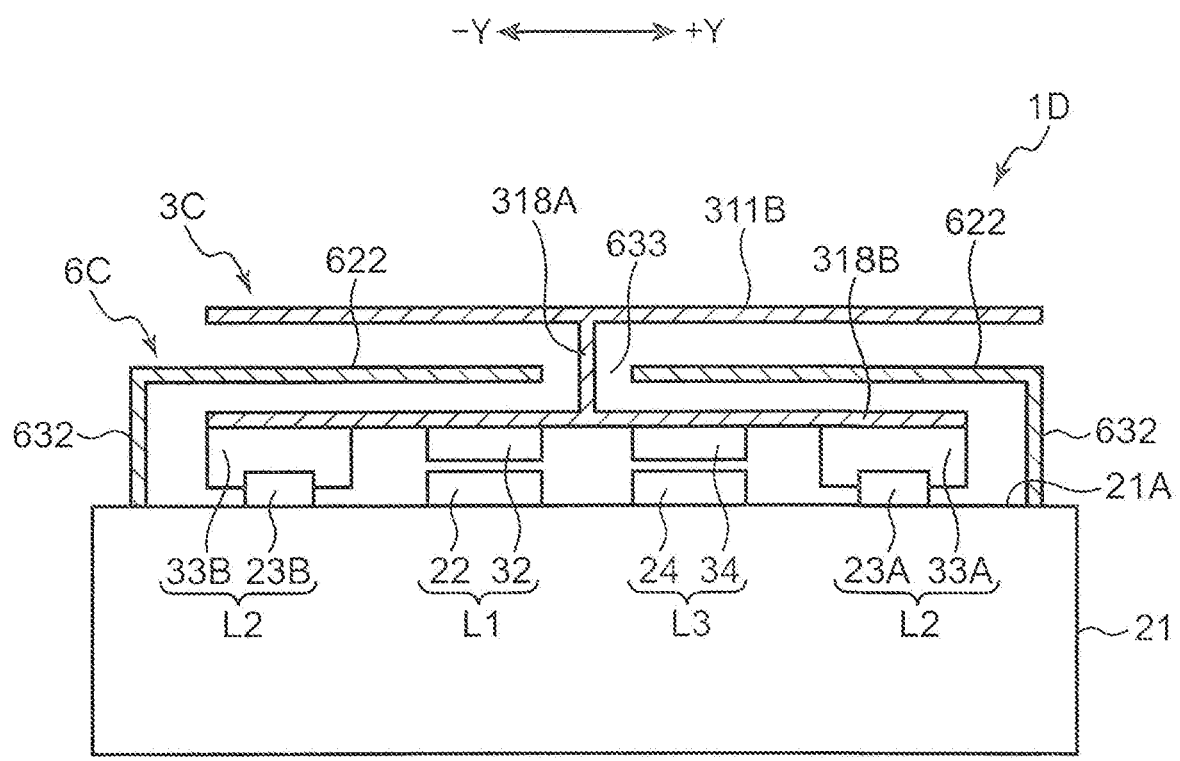
FIG. 12 is a schematic cross-sectional view of a linear conveyor device according to a fourth modification.

FIG. 12 is a schematic cross-sectional view of a linear conveyor device 1D according to a fourth modification in a width direction. A cover member 6C of the linear conveyor device 1D includes a pair of side end support legs 632 and a pair of horizontal cover portions 622. The side end support legs 632 are formed upright from +Y and −Y end portions of an upper surface 21A of a base frame 21 respectively. The horizontal cover portions 622 extend in a horizontal direction toward the center in the width direction of the base frame 21 respectively from upper ends of the side end support legs 632. A slit 633 is formed between distal end portions of the pair of horizontal cover portions 622.

The slider 3C of the linear conveyor device 1D is an H-shaped member including an upper plate 311B, the vertical plate 318A, and a bottom plate 318B. The upper plate 311B and the bottom plate 318B which are respectively formed of a flat plate are arranged parallel to each other with a predetermined distance therebetween in a vertical direction, and the upper plate 311B and the bottom plate 318B are connected to each other by the vertical plate 318A at the center positions in the width direction of the upper plate 311B and the bottom plate 318B. The vertical plate 318A penetrates the slit 633 in the vertical direction, and the bottom plate 318B is accommodated in the cavity defined by the pair of horizontal cover portions 622. The upper plate 311B is positioned above the horizontal cover portions 622.

A linear motor mover 32, first and second guide blocks 33A, 33B, and a magnetic scale 34 are mounted on a lower surface of the bottom plate 318B.

Also in the third and fourth modifications, while maintaining the structure where the slider 3B, 3C can be guided by the pair of guide rails 23A, 23B in a stable manner, the upper surface 21A of the base frame 21 is covered and concealed by the cover member 6B, 6C and hence, it is possible to protect the upper surface 21A. Further, the cover member 6B, 6C respectively include the side end support legs 631, 632 as support legs formed upright on the upper surface 21A and hence, the assembling structure of assembling the cover member 6B, 6C to the base frame 21 can be simplified. Further, the shape of the cover member 6B, 6C per se also can be simplified.

The above-described specific embodiments mainly include the disclosures having the following configurations.

A linear conveyor device according to one aspect of the present disclosure includes a slider having a linear motor mover; a straight-line conveyance part including a linear motor stator and a guide portion for guiding movement of the slider on an upper surface of the straight-line conveyance part; and a cover member covering the upper surface of the straight-line conveyance part so as to cover and conceal the linear motor stator and the guide portion from above. The slider has a shape which allows the slider to be fitted on the cover member in a movable manner in an extending direction of the straight-line conveyance part.

According to the linear conveyor device, the linear motor stator and the guide portion are covered by the cover member from above. Accordingly, it is possible to prevent the intrusion of contaminant, a foreign material and the like into the members from above. Further, the slider has a shape which allows the slider 3 to be fitted on the cover member in a movable manner in the extending direction of the straight-line conveyance part and hence, there is no possibility that the movement of the slider is prevented.

In the above-mentioned linear conveyor device, it is preferable that the straight-line conveyance part include a base frame having an upper surface which holds the linear motor stator and the guide portion, the guide portion be formed of a pair of guide portions which is disposed on one side and the other side of the upper surface of the base frame in a width direction orthogonal to the moving direction, and the cover member include: a support leg mounted upright on the upper surface of the base frame; and a horizontal cover portion extending in the width direction from an upper end of the support leg so as to cover and conceal the pair of guide portions from above.

According to the linear conveyor device, the pair of guide portions is provided to the base frame and hence, the guide portions can guide the slider in a stable manner. Further, the cover member includes the support leg which is formed upright on the upper surface of the base frame and hence, the assembling structure of assembling the cover member to the linear conveyor can be simplified. Further, the cover member is configured to include the support leg and the horizontal cover portion and hence, a shape of the cover member per se also can be simplified.

In the above-mentioned linear conveyor device, it is preferable that the support leg be mounted upright on the center region of the upper surface of the base frame in the width direction, and the horizontal cover portion be formed of a cover member which extends from the upper end of the support leg toward one side and the other side in the width direction.

According to the linear conveyor device, the cover member is formed into a T shape in cross section in a width direction. Accordingly, it is possible to easily provide the structure where the entire upper surface of the base frame is covered and concealed by the horizontal cover portion and, at the same time, it is possible to provide the cover member well-balanced in the width direction. With such a configuration, it is possible to acquire an advantageous effect that the slider to be fitted on the cover member can be also easily formed into a well-balanced shape in the width direction.

In this case, it is preferable that the cover member further include the side surface cover portions respectively extending downward from the one-side end portion and the other-side end portion of the horizontal cover portion in the width direction.

According to the linear conveyor device, the sides of the base frame can also be covered and concealed by the side surface cover portions and hence, protective performance of the cover member with respect to contaminant, foreign materials and the like can be further increased.

In the above-mentioned linear conveyor device, it is preferable that the linear motor stator be disposed on the upper surface of the base frame between the support leg and one of the pair of guide portions.

According to the linear conveyor device, one of the guide portions is covered by the horizontal cover portion of the cover member and hence, by arranging the linear motor stator as described above, it is possible to provide the structure where the linear motor stator is also covered by the horizontal cover portion with certainty.

In this case, it is preferable that the linear conveyor device further include the linear scale which is formed of the magnetic scale mounted on the slider and the magnetic sensor disposed on the base frame, and the magnetic sensor be disposed on the upper surface of the base frame between the support leg and the other of the pair of guide portions.

According to the linear conveyor device, it is possible to provide the structure where the magnetic sensor is also covered by the cover member. Further, by arranging the magnetic sensor as described above, it is possible to provide the structure where the magnetic sensor is covered with certainty by the horizontal cover portion which covers the other of the guide portions.

In the above-mentioned linear conveyor device, it is preferable that the slider include: a guided portion guided by the guide portion; a placing part positioned above the cover member; and a facing portion facing an upper surface of the straight-line conveyance part, and holding the linear motor mover and the guided portion.

According to the linear conveyor device, it is possible to provide the slider which moves in the extending direction of the straight-line conveyance part while placing an object to be conveyed on the placing part.

In the above-mentioned linear conveyor device, it is preferable that the slider include: an upper plate positioned on an upper side of the horizontal cover portion; a pair of side plates respectively extending downward from end portions of the upper plate on one side and the other side in the width direction, and positioned outside a one-side end portion and an other-side end portion of the horizontal cover portion in the width direction; and a pair of lower plates extending from respective lower ends of the pair of side plates toward the center in the width direction, a fitting portion in which the cover member is fitted be formed of the upper plate, the pair of side plates, and the pair of lower plates, a guided portion guided by the guide portion be mounted on each of the pair of lower plates, and the linear motor mover be mounted on one of the pair of lower plates.

According to the linear conveyor device, the structure is provided where the slider wraps the cover member by the upper plate, the pair of side plates, and the pair of lower plates except for the support leg portion. Further, the guided portion and the linear motor mover are mounted on the lower plate and hence, the linear conveyor device can perform a function of the linear guide and a function of the linear motor. Accordingly, the structure can be achieved where even when the cover member covers the entire upper surface of the base frame, the slider can be freely movable in the extending direction of the straight-line conveyance part. Further, the slider can be easily fitted on the cover member from an end edge of the cover member.

In addition to the above-mentioned configuration, it is preferable that the magnetic scale be mounted on the other of the pair of lower plates. According to the linear conveyor device, the magnetic scale is further mounted on the lower plate and hence, the linear conveyor device can perform a function of the linear scale.

In the above-mentioned linear conveyor device, it is preferable that the straight-line conveyance part be formed by linearly connecting a plurality of modules each of which includes the linear motor stator and the guide portion, and the cover member be provided to each of the modules.

According to the linear conveyor device, by connecting the desired number of modules to each other, the conveyance path length of the straight-line conveyance part can be set as desired. Further, the cover member is provided to each of the respective modules and hence, by merely connecting the modules to each other, it is also possible to achieve protection of the respective modules against contaminant, a foreign material and the like.

In the above-mentioned linear conveyance device, it is preferable that the linear conveyor device further include a base member disposed between a platform which forms an installation base of the linear conveyor device and lower surfaces of modules at a connecting portion between the modules, the base member being configured to position and support the modules.

According to the linear conveyor device, instead of directly connecting the modules to each other, the modules to be connected to each other are positioned with respect to the base member and are mounted on the base member respectively so that the modules can be connected to each other eventually whereby positioning of both modules can be easily controlled. Further, the base member is interposed between the modules and hence, the modules can be connected to each other without being affected by the state of the platform. Accordingly, the modules can be connected to each other simply with high accuracy.

According to the linear conveyor device of the present disclosure described heretofore, it is possible to provide a linear conveyor device which can overcome drawbacks such as contamination of constitutional members of a linear conveyor, impingement of a foreign material to the constitutional members, and falling of an object to be conveyed. Accordingly, the present disclosure can largely contribute to the simplification of a maintenance operation and the like of the linear conveyor device on a user side.

What is claimed is:

1. A linear conveyor device comprising:
   a slider having a linear motor mover;
   a straight-line conveyor including a linear motor stator and a guide configured to guide movement of the slider on an upper surface of the straight-line conveyor; and
   a cover covering the upper surface of the straight-line conveyor so as to cover and conceal the linear motor stator and the guide from above,
   wherein the slider has a shape which allows the slider to be fitted on the cover in a movable manner in an extending direction of the straight-line conveyor,
   the straight-line conveyor is formed by linearly connecting a plurality of modules each of which includes the linear motor stator and the guide,
   the cover is provided to each of the modules, and
   the linear conveyor device further comprises a base disposed between a platform which forms an installation base of the linear conveyor device and lower surfaces of modules at a connecting portion between the modules, the base being configured to position and support the modules.

2. The linear conveyor device according to claim 1, wherein
   the straight-line conveyor includes a base frame having an upper surface which holds the linear motor stator and the guide,
   the guide is formed of a pair of guide portions which is disposed on one side and the other side of the upper surface of the base frame in a width direction orthogonal to the moving direction, and
   the cover includes: a support leg mounted upright on the upper surface of the base frame;
   and a horizontal cover portion extending in the width direction from an upper end of the support leg so as to cover and conceal the pair of guide portions from above.

3. The linear conveyor device according to claim 2, wherein
   the support leg is mounted upright on a center region of the upper surface of the base frame in the width direction, and
   the horizontal cover portion extends from the upper end of the support leg toward one side and the other side in the width direction.

4. The linear conveyor device according to claim 3, wherein the cover further includes side surface cover portions respectively extending downward from a one-side end portion and an other-side end portion of the horizontal cover portion in the width direction.

5. The linear conveyor device according to claim 4, wherein the linear motor stator is disposed on the upper surface of the base frame between the support leg and one of the pair of guide portions.

6. The linear conveyor device according to claim 4, wherein the slider includes: a guided portion guided by the guide; a placing part positioned above the cover; and a facing portion facing an upper surface of the straight-line conveyor, and holding the linear motor mover and the guided portion.

7. The linear conveyor device according to claim 4, wherein
   the slider includes:
   an upper plate positioned on an upper side of the horizontal cover portion;
   a pair of side plates respectively extending downward from end portions of the upper plate on one side and the other side in the width direction, and positioned outside a one-side end portion and an other-side end portion of the horizontal cover portion in the width direction; and a pair of lower plates extending from respective lower ends of the pair of side plates toward the center in the width direction, a fitting portion in which the cover is fitted is formed of the upper plate, the pair of side plates, and the pair of lower plates, a guided portion guided by the guide portion is mounted on each of the pair of lower plates, and the linear motor mover is mounted on one of the pair of lower plates.

8. The linear conveyor device according to claim 4, wherein the base includes a bottom plate, a pair of protruding ridge protruding upward from the bottom plate, and a plurality of semispherical protrusion formed on upper surfaces of the pair of protruding ridges, each of the modules to be connected to each other has a receiving hole on a lower surface thereof, the receiving hole allowing the semispherical protrusion to fit thereinto.

9. The linear conveyor device according to claim 3, wherein the linear motor stator is disposed on the upper surface of the base frame between the support leg and one of the pair of guide portions.

10. The linear conveyor device according to claim 9, further comprising:

a linear scale which is formed of a magnetic scale mounted on the slider and a magnetic sensor disposed on the base frame, wherein the magnetic sensor is disposed on the upper surface of the base frame between the support leg and the other of the pair of guide portions.

11. The linear conveyor device according to claim 10, wherein the slider includes:

an upper plate positioned on an upper side of the horizontal cover portion;

a pair of side plates respectively extending downward from end portions of the upper plate on one side and the other side in the width direction, and positioned outside a one-side end portion and an other-side end portion of the horizontal cover portion in the width direction; and a pair of lower plates extending from respective lower ends of the pair of side plates toward a center in the width direction, a fitting portion in which the cover is fitted is formed of the upper plate, the pair of side plates, and the pair of lower plates, a guided portion guided by the guide is mounted on each of the pair of lower plates, and the linear motor mover is mounted on one of the pair of lower plates, and the magnetic scale is mounted on the other of the pair of lower plates.

12. The linear conveyor device according to claim 9, wherein the slider includes:

an upper plate positioned on an upper side of the horizontal cover portion;

a pair of side plates respectively extending downward from end portions of the upper plate on one side and the other side in the width direction, and positioned outside a one-side end portion and an other-side end portion of the horizontal cover portion in the width direction; and a pair of lower plates extending from respective lower ends of the pair of side plates toward the center in the width direction, a fitting portion in which the cover is fitted is formed of the upper plate, the pair of side plates, and the pair of lower plates, a guided portion guided by the guide portion is mounted on each of the pair of lower plates, and the linear motor mover is mounted on one of the pair of lower plates.

13. The linear conveyor device according to claim 3, wherein the slider includes:

an upper plate positioned on an upper side of the horizontal cover portion;

a pair of side plates respectively extending downward from end portions of the upper plate on one side and the other side in the width direction, and positioned outside a one-side end portion and an other-side end portion of the horizontal cover portion in the width direction; and a pair of lower plates extending from respective lower ends of the pair of side plates toward the center in the width direction, a fitting portion in which the cover is fitted is formed of the upper plate, the pair of side plates, and the pair of lower plates, a guided portion guided by the guide portion is mounted on each of the pair of lower plates, and the linear motor mover is mounted on one of the pair of lower plates.

14. The linear conveyor device according to claim 3, wherein the slider includes: a guided portion guided by the guide; a placing part positioned above the cover; and a facing portion facing an upper surface of the straight-line conveyor, and holding the linear motor mover and the guided portion.

15. The linear conveyor device according to claim 2, wherein the slider includes: a guided portion guided by the guide; a placing part positioned above the cover; and a facing portion facing an upper surface of the straight-line conveyor, and holding the linear motor mover and the guided portion.

16. The linear conveyor device according to claim 1, wherein the slider includes: a guided portion guided by the guide; a placing part positioned above the cover; and a facing portion facing an upper surface of the straight-line conveyor, and holding the linear motor mover and the guided portion.

\* \* \* \* \*